(12) United States Patent
Puig et al.

(10) Patent No.: US 11,749,037 B2
(45) Date of Patent: Sep. 5, 2023

(54) LOCKING AND DE-ENERGIZATION MANAGEMENT SYSTEM AND LOCKING AND DE-ENERGIZATION MANAGEMENT METHOD

(71) Applicant: BOSCH SOLUÇÕES INTEGRADAS BRASIL LTDA., Campinas (BR)

(72) Inventors: Tiago Carril Puig, Vinhedo (BR); Aline Vieira da Silva, Campinas (BR); André de Almeida Pinto, Itapira (BR); Rafael de Menezes Barros, Campinas (BR); Daul Ruiz Dias Neto, Campinas (BR); Nathan Gustavo Vieira Ribeiro, Indaiatuba (BR); Marcelo Magrin Ziliotti, Campinas (BR)

(73) Assignee: BOSCH SOLUÇÕES INTEGRADAS BRASIL LTDA., Campinas (BR)

( * ) Notice: Subject to any disclaimer, the term of this patent is extended or adjusted under 35 U.S.C. 154(b) by 885 days.

(21) Appl. No.: 16/570,207

(22) Filed: Sep. 13, 2019

(65) Prior Publication Data
US 2020/0090440 A1 Mar. 19, 2020

Related U.S. Application Data

(60) Provisional application No. 62/731,326, filed on Sep. 14, 2018.

(51) Int. Cl.
*G07C 9/00* (2020.01)
*E05B 47/00* (2006.01)
(Continued)

(52) U.S. Cl.
CPC ...... *G07C 9/00563* (2013.01); *E05B 47/0001* (2013.01); *E05B 67/00* (2013.01);
(Continued)

(58) Field of Classification Search
None
See application file for complete search history.

(56) References Cited

U.S. PATENT DOCUMENTS 6,472,973 B1 * 10/2002 Harold ............... G07C 9/23
340/5.1
8,889,277 B2 * 11/2014 Lakamraju ......... E05B 17/0075
70/277

(Continued)

FOREIGN PATENT DOCUMENTS

AU 2018214004 2/2019
BR 102017009512 11/2018

*Primary Examiner* — Carlos Garcia
(74) *Attorney, Agent, or Firm* — Michael Best & Friedrich, LLP

(57) ABSTRACT

An equipment locking and de-energization management system (7) is configured to guarantee safety during the locking and de-energization of a power source (6) of an item of equipment (7) during maintenance thereof. The system includes an intelligent lock (1) to be inserted into the power source (6) and perform the locking thereof, a control device (2) configured to manage and sort the locking steps and a central server (15) to assist with the communication between the elements of the locking and de-energization management system. Also described is an equipment locking and de-energization management method (7) which makes use of the locking and de-energization management system, enhancing the safety, efficiency and productivity during locking and de-energization of the power source (6) of an item of equipment (7) undergoing maintenance.

9 Claims, 3 Drawing Sheets

(51) Int. Cl.
*E05B 67/00* (2006.01)
*F16P 3/00* (2006.01)
*G07C 9/27* (2020.01)
*F16P 3/08* (2006.01)

(52) U.S. Cl.
CPC ............... *F16P 3/00* (2013.01); *F16P 3/08* (2013.01); *G07C 9/00309* (2013.01); *G07C 9/00571* (2013.01); *G07C 9/00896* (2013.01); *G07C 9/27* (2020.01); *E05B 2047/0067* (2013.01)

(56) References Cited

U.S. PATENT DOCUMENTS

| | | | |
|---|---|---|---|
| 9,373,201 B2* | 6/2016 | Jefferies | G06Q 30/0645 |
| 2009/0140856 A1* | 6/2009 | George | G07C 9/00896 |
| | | | 340/542 |
| 2009/0207020 A1* | 8/2009 | Garnier | G08G 3/00 |
| | | | 340/541 |
| 2014/0028443 A1 | 1/2014 | Ebner | |
| 2014/0283018 A1* | 9/2014 | Dadu | G06F 21/70 |
| | | | 726/19 |
| 2019/0172055 A1* | 6/2019 | Hale | G06K 19/06187 |
| 2021/0388638 A1* | 12/2021 | Snodgrass | E05B 47/068 |

* cited by examiner

LOCKING AND DE-ENERGIZATION MANAGEMENT SYSTEM AND LOCKING AND DE-ENERGIZATION MANAGEMENT METHOD

FIELD OF THE INVENTION

The present invention refers to a system for the management of unlocking and de-energization equipment applied in various types of industry, more specifically, equipment used in the mining industry. The present invention also refers to a method to execute said management of the equipment unlocking and de-energization applied in various types of industry by means of the system.

BACKGROUND OF THE INVENTION

The unlocking and de-energization process refers to a practice and a procedure specifically applied during the necessary maintenance stoppages required for the full working of a machine and/or equipment applied in a certain industrial sector. This process is performed in order to guarantee the safety of the collaborators in charge of carrying out the maintenance of said machine and/or equipment, its function being to guarantee that the machine and/or equipment under maintenance is not powered up and, consequently, activated.

Said unlocking and de-energization process requires a specific collaborator to switch off and detach the machine and/or equipment from its power source—and this may be electric, hydraulic, pneumatic and others—before carrying out the maintenance service on the intended machine and/or equipment.

After detaching the equipment from its power source, it is still necessary for the conclusion of the unlocking and de-energization process to lock and identify that the machine is isolated for maintenance in order to prevent its accidental or involuntary power-up, guaranteeing that it is not powered up during maintenance thereof and, consequently, preventing accidents deriving from undesired power-up.

Therefore, if there is a risk of power-up of the machine and/or equipment during maintenance thereof, that is, if the unlocking and de-energization process was not performed with safety and such that it prevents the removal thereof during maintenance, there is an imminent risk of an accident as a result of powering-up of the machine and/or equipment during maintenance thereof, which may cause damage to the machine and/or equipment itself and, principally, may injure the collaborator performing the maintenance.

In the state of the art, the unlocking and de-energization process of machines and equipment is basically carried out in seven steps, these being described in detail ahead. The first step consists of identifying and defining the machine intended for the unlocking and the power source (electric, hydraulic, pneumatic, etc.) related to the intended machine, this step being carried out entirely manually, where the collaborator himself/herself checks the installation based on his/her professional experience and identifies the power source of the machine.

Due to the fact that the power source is identified manually by the collaborator, depending on the industrial plant where maintenance is being carried out, that is, if it is an industrial plant with dozens and/or hundreds of different power sources, as occurs in the mining industry, this first step may require excessive time to be performed, besides being subject to errors by the collaborator in identifying the correct power source.

The second step of the process consists of switching off the power source of the equipment, where same is mechanically isolated and locked so as not to be re-activated. As in the first step, this second step is also carried out entirely manually, being subject to human errors such as, for example, the collaborator unlocking and isolating a wrong power source or, furthermore, failing to switch off and unlock in an efficient manner, there being no type of check in this step.

This isolation and unlocking described in the second step is typically carried out with mechanical locks that prevent the equipment from being re-activated. However, in the state of the art these locks are common locks with keys, without any type of automation or signaling that its unlocking has been duly and correctly executed.

The third step consists of keeping the key of the lock used in the unlocking of the second step in a department box, such that, if multiple unlockings with multiple locks are carried out in the second step, all the keys of the respective locks must be deposited inside this box and it must be managed by a person in charge.

This third step is also carried out entirely by a collaborator without any automatic check step or automated means to guarantee that all the keys have been deposited in the department box, thus like all the other aforementioned steps, are subject to human error.

The fourth step consists of transporting said department box, with the keys of the respective locks used in the unlocking of the second step already inserted inside. This transport consists of moving the department box to the place where the maintenance should be carried out, which may be several kilometers depending on the industry and the equipment where maintenance is being carried out.

For example, when the unlocking and de-energization process is carried out in the mining industry, for the maintenance of belt conveyors, its power source is commonly kilometers away, it thus being necessary in this fourth step of the process to cover all this distance to move the department box of the power source where the unlocking and de-energization was carried out to the equipment undergoing maintenance.

The fifth step is thus begun as soon as the department box reaches the equipment where the maintenance is being carried out, such that when it reaches it, all the collaborators in charge of maintenance carry out an unlocking of the department box by means of their personal locks, preventing unauthorized parties from having access to the keys disposed inside same.

This unlocking of the department box is crucial for guaranteeing the safety of the process because it prevents unauthorized third parties from having access to the keys of the locks used in the unlocking carried out in the second step, such that, it is impossible to re-energize the equipment without the key of the lock that is locking it.

Nevertheless, it is important to note that just as all the other steps, the fifth step of unlocking the department box is also carried out by persons, without any type of automation or automatic check to guarantee that all involved in the maintenance have in fact locked the department box, thus also being subject to human error.

The sixth step only begins when the maintenance on the equipment of interest has been concluded, such that after finalizing the maintenance, the collaborators involved therewith will carry out the unlocking of the department box by removing their personal locks, enabling a person to have access to the keys disposed inside same, there being no automated check or safety guarantee that all the collaborators placed their lock in the department box, nor that the maintenance was finalized by all the collaborators involved, being subject to human error.

The seventh and final step of the process consists of the transport of the department box by the person in charge of the equipment undergoing maintenance to its power source, performing the removal of the unlockings made in the second step of the process by means of the keys disposed inside the department box, already unlocked by the collaborators in charge of maintenance.

In this step, a person in charge of unlocking, after reaching the power source of the equipment, performs the removal of the locks used in the unlocking thereof and reconnects the power source, making the equipment powered by this power source resume normal operations after the maintenance thereof has been completed, thus ending the unlocking and de-energization process.

Therefore, as expounded above, it is evident that the unlocking and de-energization process of the state of the art comprises various shortcomings in relation to the safety, all its steps being carried out manually without any type of automated check or any means to automatize the step, thus being subject to human error.

Additionally, the unlocking and de-energization process from the state of the art also discloses shortcomings in relation to the its efficiency and productivity such as, for example, in the steps where it is necessary to transport the department box of the power source to the equipment undergoing maintenance and vice-versa, requiring excessive time for execution, and generating losses as a result of the downtime of the equipment for maintenance.

In the state of the art there are patent documents related to systems, equipment and methods to assist with unlocking and de-energization process of various machines and/or equipment, one of these being document BR102017009512-6, which describes a management system for the maintenance of electrical equipment.

In the system described in the aforementioned document, the unlocking and de-energization process of the equipment intended for the unlocking is partially simplified by understanding two control devices, one being associated to the power source of the equipment and the other associated to the equipment itself.

The function of this control device is to store a key used in the unlocking carried out at the power source, such that they have communication between themselves to enable a warning that the power source is locked and switched off, and also that the maintenance on the equipment has been finalized.

By means of this communication, it is no longer necessary to transport the department box of the power source to the equipment undergoing maintenance and vice-versa, meaning it is possible through this communication and by means of a code the collaborator who carried out the unlocking can access the key disposed inside the control device.

Nevertheless, although the system described in BR102017009512-6 presents improved efficiency and a minor increase in safety, same still has serious safety failures which may generate accidents, having steps that are carried out only by humans without any type of check and/or automation.

As an example of these steps, it is possible to cite the step of inserting a key inside the control device, which can done even before the unlocking and switching off of the power source has been duly carried out, there being no means of confirming whether the power source is switched off before communicating same by the insertion of its key.

Additionally, the system described in document BR102017009512-6 does not disclose any type of automation to identify the power source for the respective equipment, such that the recognition of the power source for that equipment is carried out manually by a collaborator, being subject to human error and mistakes that may generate very serious accidents.

Nevertheless, the system described in the Brazilian document cited above does not comprise any means of checking to attest that the unlocking was carried out at the correct power source of the respective equipment, also being subject to human error and mistakes in the case of the unlocking being carried out at a different power source of the equipment which is undergoing maintenance.

Another document from the state of the art consists in document US20140028443, which describes an electronic system of monitoring unlockings and de-energization of equipment in general. The system described in the North American document cited above comprises an unlocking device, a lock and a reader.

The unlocking device is configured to have contact with the power source of the equipment intended for maintenance, comprising a communication module to emit signals on its status (or unlocked), signaling whether it is locked (switching off the power source) or unlocked (switching on the power source) for the reader.

To guarantee that the unlocking device alters its status from locked to unlocked or vice-versa involuntarily, the lock is fastened thereon to keep it in the desired position and thus prevent this undesired change of status.

The reader then takes a reading of the signal emitted by the communication module of the unlocking device, visualizing whether the unlocking is concluded so as then to being the maintenance on the equipment powered by the locked power source.

Nevertheless, although document US20140028443 discloses an automation of the unlocking and de-energization process, it still discloses certain safety failures such as, for example, not having any type of communication between the lock and the unlocking device to check whether the lock is locking the correct unlocking device, or even whether the unlocking device is in the correct panel or power source.

Additionally, the unlocking device necessary for applying the unlocking and de-energization system described in this North American document increases the complexity of the system, making it necessary to acquire this unlocking device with communication module and, consequently, substantially increasing the cost for implementing this unlocking and de-energization system.

Nevertheless, document US20140028443 does not disclose any means or system for identifying or check which power source corresponds to the equipment on which maintenance is being carried out, being subject to failures and human errors during the identification thereof, principally in industries with dozens and even hundreds of power sources for different equipment in a same plant.

Lastly, document US20140028443 also discloses safety failures in relation to the communication for energizing the power source of the equipment which is undergoing maintenance, such that there is no type of check or automation of the process for requesting power-up of the locked power source at the end of maintenance of the equipment.

Another document from the state of the art consists of AU2018214004, which describes an equipment unlocking and de-energization system to be applied in industrial plants.

Said system comprises an intelligent unlocking device, a central device and a team device, all communicating between themselves.

The intelligent unlocking device is configured to be fastened to the power source of the equipment intended for maintenance, same being communicant with the central device to advise on its status, that is, whether or not it is unlocked.

The central device is configured to receive the signal on the status of the intelligent unlocking system and, thereafter, relay this information to the team device, which is handled by means of the team in charge of maintenance of the equipment.

Therefore, the maintenance team is aware that the unlocking and de-energization of the power source was carried out by means of the signal sent from the central device to the team device. In the same manner, when the maintenance on the equipment is finalized, the team device sends a signal informing the conclusion of the maintenance to the central device which, thereafter, sends an unlocking to the intelligent unlocking device so that the power source is unlocked and connected again.

Nevertheless, although the document AU2018214004 presents an intelligent communication between the elements that make up the equipment unlocking and de-energization system, same does not disclose any means of communication between the intelligent unlocking device and the power source, such that there is no type of check that the intelligent unlocking device was fastened to the correct power source, being subject to failures and human error.

Additionally, document AU2018214004 does not disclose any type of automated means for identifying the power source corresponding to the equipment intended for maintenance, so there is no type of check of the power source which is being switched off and locked corresponding to the equipment intended for maintenance, presenting a serious safety risk.

Therefore, based on the equipment unlocking and de-energization systems comprised by the state of the art cited above, it is concluded that there is no equipment management and de-energization system that guarantees a safe check of all its steps, guaranteeing that the unlocking has been carried out at the correct power source.

Still based on the documents comprised in the state of the art, it is concluded that there is no equipment management and de-energization system in the state of the art that permits its application and implementation in a simplified manner and at low cost, not requiring adaptations in the equipment or power source already existing in the plant.

Lastly, also based on documents from the state of the art disclosed above, it is also concluded that there is no equipment management and de-energization system capable of fully identifying the power source relating to the equipment intended for maintenance, increasing the efficiency, the productivity and the safety in the unlocking and de-energization process of the equipment.

OBJECTIVES OF THE INVENTION

The objective of the present invention is an equipment management and de-energization system that guarantees the safety of the equipment unlocking and de-energization process, carrying out a safe and automated check in all the steps comprised in the process.

The objective of the present invention is also an equipment management and de-energization system that enables it to be applied and implemented in a simple manner and at low cost, without requiring changes and adaptations to equipment pre-existing at the plant where it is being applied.

The objective of the present invention is also an equipment management and de-energization system capable of fully identifying the power source relating to the equipment intended for maintenance, increasing the efficiency, the productivity and the safety of the process.

Lastly, the objective of the present invention is also an unlocking management method and de-energization of equipment with high safety, efficiency and productivity.

SUMMARY OF THE INVENTION

In a preferred embodiment of the present invention, it discloses an equipment management and de-energization system powered by the power source and installed in an industrial plant, comprising: at least an intelligent lock configured to be inserted into the power source; and at least a mobile control device.

The intelligent lock comprises: a body; a lock; a communication interface configured to communicate the intelligent lock with the power source and with the control device; an electromechanical latch capable of locking and unlocking the lock of the intelligent lock; an electronic processor configured to process the information received and sent by means of the communication interface and drive the electromechanical latch of the intelligent lock; and a sensor to identify whether the intelligent lock is locked or unlocked.

The control device comprises: a communication interface configured to communicate the control device with the intelligent lock; a visor capable of displaying the information communicated between the intelligent lock and the control device; a reader element configured to read an identifier fastened on the equipment; an identifier element identifying the collaborators involved in the equipment unlocking and de-energization; and an electronic processor configured to process the information received and sent from the reader element, from the identifier element and from the intelligent lock.

The unlocking and de-energization management system further comprises at least a central server configured to store and manage the data sent and received between the intelligent lock and the control device, intermediating the communication between the intelligent lock and the control device.

The communication between the power source and the intelligent lock is performed by means of a communication element fastened on the power source, enabling the communication interface of the intelligent lock to communicate with the communication element of the power source and to perform an identification of the intelligent lock and of the power source. This identification of the intelligent lock and of the power source by means of the communication between the communication interface of the intelligent lock and the communication element of the power source makes it possible to verify which intelligent lock is fixed to which power source.

The electromechanical latch of the intelligent lock is not driven when the identification of the communication element of the power source does not correspond to the identification of the power source of the equipment. The communication element of the power source communicates with the communication interface of the intelligent lock by wired or wireless communication means.

In the preferred embodiment, the equipment unlocking and de-energization system further comprises a platform communicating with the central server to provide access to the data and information of the equipment management and de-energization system remotely.

The reading of the identifier of the equipment by means of the reader element of the control device identifies the power source which powers the equipment. The identification element consists of a biometric reader identifying, at least, the name, identification number, position and duties of the collaborator. Additionally, the identification element comprises an encoded card configured to be inserted into the control device to activate and deactivate the identification element.

Still in the preferred embodiment, the present invention also describes an unlocking management method and de-energization of equipment that makes use of the equipment unlocking and de-energization system as defined above, comprising the following steps: i. Identifying the power source which powers the equipment by means of the reader element of the control device; ii. Requesting the unlocking and de-energization of the power source identified in the first step by means of the control device; iii. Switching off and locking the power source identified in the first step by means of the fastening of the intelligent lock at the power source; iv. Verifying the positioning of the intelligent lock with the power source by means of the communication between the communication interface of the intelligent lock and a communication element of the power source; v. Locking the intelligent lock by driving its electromechanical latch; vi. Emitting a signal informing the conclusion of the switching off and unlocking of the power source by means of the communication interface of the intelligent lock to the control device; vii. Identifying the collaborators involved in the maintenance of the equipment by means of the identification element of the control device; viii. Performing maintenance of the equipment; ix. Emitting a signal informing the conclusion of the maintenance of the equipment by means of the communication interface of the control device to the intelligent lock; x. Requesting the unlocking and the switching on of the power source by means of the control device; xi. Unlocking and switching on the power source of the equipment by means of the removal of the intelligent lock; and xii. Signaling the conclusion of the unlocking and switching on of the power source of the equipment by means of the communication interface of the lock to the control device.

The identification of the power source which powers the equipment in step i is carried out by means of reading an identifier fastened to the equipment by the reader element of the control device. The verification of the positioning of the intelligent lock with the power source of step iv consists of verifying whether the identification of the power source received by the communication between the communication interface of the intelligent lock and the communication element of the corresponding power source with the identification of the power source identified in step i.

The unlocking of the intelligent lock in step v is carried out only if the identification of the power source corresponds to the identification of the power source identified in step i. The emission of the signal informing the conclusion of the maintenance of step ix is carried out after the second identification of all the collaborators involved in the maintenance by means of the identification element of the control device.

The removal of the intelligent lock in step xi consists of digital and not physical removal when the intelligent lock is related to another simultaneous unlocking and de-energization process at that same power source.

BRIEF DESCRIPTION OF THE DRAWINGS

The present invention is described in detail based on the respective drawings.

DETAILED DESCRIPTION OF THE INVENTION

Figure 1:
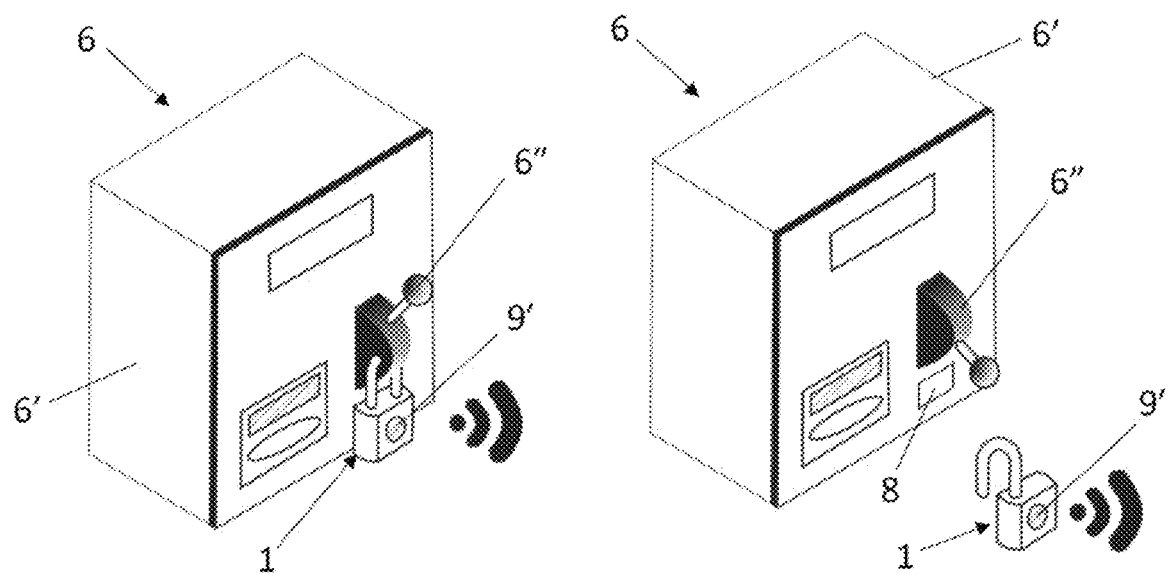
FIG. 1 discloses a perspective view of an exemplary embodiment of the locked power source and unlocked by the intelligent lock of the unlocking and de-energization management system of the present invention.

The present invention proposes an equipment management and de-energization system in general, guaranteeing a substantial increase in the safety, efficiency and productivity of the unlocking and de-energization processes by means of an automated check of the due positioning and unlocking of the elements of said system, and also by means of an identification and check of the power source 6 of the equipment 7 intended for maintenance in an automated and integrated manner.

In its preferred configuration, the equipment unlocking and de-energization system 7 of the present invention comprises at least an intelligent lock 1, at least a central server 15 and at least a control device 2, each one of these elements being described in detail ahead.

The intelligent lock 1 consists of a common lock from the state of the art improved with electronic means to guarantee its application in the unlocking and de-energization system of the present invention, it being configured to be fastened and lock a power source 6 responsible for powering the equipment 7 undergoing maintenance.

The power source 6 consists of all and any type of energy provider capable of moving and activating the equipment 7 intended for maintenance, such that the power source 6 may take on forms such as electrical panels, compressors, and other types of sources capable of providing energy, be this electric, hydraulic, pneumatic, and others to the equipment 7 intended for maintenance.

Fastening the intelligent lock 1 on the power source 6 and, consequently, the unlocking thereof is carried out with his/her key or element responsible for switching off, such as, but not limited to, the power source 6 consisting of an electrical panel 6', which has a key to alternate it from switched on to switched off and a lock 6" to prevent the key from moving, the intelligent lock 1 is fastened specifically at its lock 6" to prevent the movement of the key of the electrical panel 6' and, consequently, from being reactivated, see FIG. 1.

It is important to emphasize that the power source 6 can be other types of energy providers apart from the electric panel 6', used solely as an example to facilitate the understanding of the system of the present invention.

Figure 2:
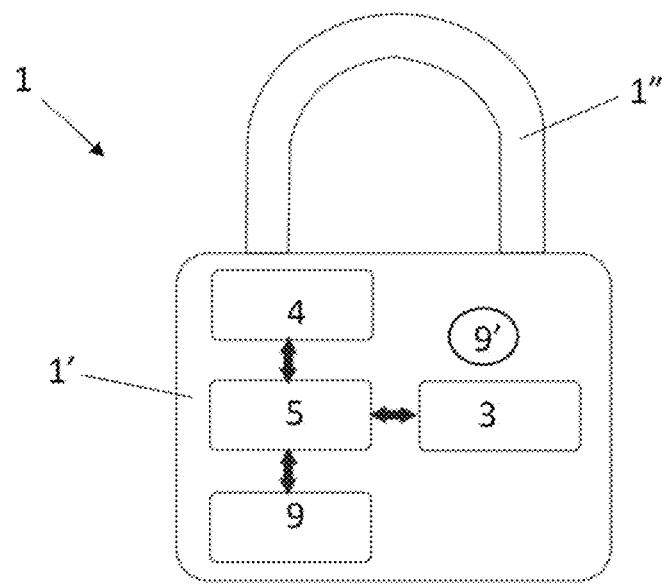
FIG. 2 shows a schematic view of the preferred configuration of the intelligent lock of the unlocking and de-energization management system of the present invention.

The intelligent lock 1, in the preferred configuration thereof, comprises, in addition to its body 1' and its lock 1"

highly disseminated and known in the common locks from the state of the art, a communication interface 3, an electromechanical latch 4, an electronic processor 5 and a sensor 9, see FIG. 2.

A communication interface 3 of the intelligent lock 1 consists of a receiver and transmitter of data, such that, by means thereof, the intelligent lock 1 is capable of communicating with the other elements of the system of the present invention. This communication, in the preferred configuration thereof, is carried out both with the power source 6 where the intelligent lock 1 is fastened, and the control device 2 by means of the central server 15.

Communication of the intelligent lock 1 with the power source 6 is of the utmost importance for the system of the present invention, such that, by means of this communication it is possible to determine and safely check whether the intelligent lock 1 is fastened and locking the correct power source 6, that is, the power source 6 which powers the equipment 7 intended for maintenance.

To make this communication possible, the power source 6 also comprises a communication element 8, this being, in the preferred configuration thereof, a passive communication element, that is, one that does not make use of a power source or needs powering. The passive communication element 8 in the preferred configuration thereof consists of an adhesive with NFC (Near Field Communication), and other types of communication can be used, in alternative configurations, such as, for example, a QR Code.

Further in alternative configurations of the communication element 8 fastened on the power source 6, same can be an active communication element such as, for example, Bluetooth, Wi-Fi, or other means of wireless communication. Additionally, further in alternative configurations, the communication element 8 can communicate with the intelligent lock 1 by means of wired communication, it merely being essential that there be this identification and communication between the elements.

This communication of the communication module 3 of the intelligent lock 1 with the communication element 8 of the power source 6 is established when the intelligent lock 1 is inserted into the power source 6 to perform the unlocking thereof, and this communication can be established by any one of the means cited above, that is, wireless means or wired means.

By means of this communication, it is possible to identify whether the intelligent lock 1 is on the correct power source 6, such that if the intelligent lock 1 is fastened on a power source 6 that does not correspond to the equipment 7 intended for maintenance, the system of the present invention does not permit it to be locked by means of its electromechanical latch 4.

The electromechanical latch 4 of the intelligent lock 1 is configured to perform a locking of its lock 1", replacing the use of a mechanical key to perform the locking and unlocking thereof. This electromechanical latch 4 is activated by means of the electronic processor 5 comprised by the intelligent lock 1, such that activating the electromechanical latch 4 prevents the intelligent lock 1 from being unlocked, that is, the lock 1" from being detached from its body 1'.

Therefore, if the communication interface 3 of the intelligent lock 1, which is also communicant with the electronic processor 5, after reading the communication element 8 of the power source 6 identifies that that one is not the correct power source 6, the intelligent lock 1 is not locked by means of the electromechanical latch 4, signaling to the collaborator that it is at the incorrect power source 6.

In the same way, if the communication interface 3 of the intelligent lock 1, after reading the communication element 8 of the power source 6 the electronic processor 5 identifies that that one is the correct power source 6, the intelligent lock 1 is locked by means of the electromechanical latch 4 and, after being locked, can only be unlocked by means of same.

To identify whether the intelligent lock 1 is locked or unlocked, as described above, the sensor 9 of the intelligent lock 1 is used. The sensor 9 of the intelligent lock 1 is configured to take a reading of the status of same, that is, whether it is locked or unlocked, being communicant with the electronic processor 5 and with the communication interface 3 of the intelligent lock 1 to relay and communicate its status with the control device 2 by means of the central server 15.

This identification of the status of the intelligent lock 1 carried out by the sensor 9 is communicated to the control device 2 by means of the communication interface 3, and also signaled in the intelligent lock 1 itself by a signaling means 9'. This signaling means 9', in the preferred configuration thereof is a visual means endowed with a green light indicating that the lock 1 is unlocked and a red light signaling that the lock 1 is locked.

In alternative configurations, the signaling means 9' can be other visual means such as, for example, a display signaling the status of the lock and, furthermore, in alternative configurations, comprises sound signals to indicate whether the intelligent lock 1 is locked and unlocked by means of the sound emitted by same.

Having described the intelligent lock 1 of the equipment unlocking and de-energization system 7 of the present invention, ahead is a description of its central server 15 and its control device 2. The central server 15, in the preferred configuration thereof, consists of a physical element configured to receive and relay the data from the intelligent locks 1 and from the control devices 2 of the system of the present invention.

In alternative configurations, the central server 15 can be made available in a cloud, not being restricted to its conception of a physical element fastened at the industrial plant, this merely being the preferred configuration thereof to guarantee communication from the central server 15 to the other elements of the system of the present invention.

By means of this data reception and transmission, the central server 15 performs a processing, storage and management of these data so as to determine the steps that should be carried out during the process of de-energization and unlocking of the equipment 7, defining which power source 6 the intelligent lock 1 should lock to perform the maintenance on a certain equipment 7.

In its preferred configuration, all this communication between the control device 2 and the intelligent lock 1 of the present invention is carried out by means of the central server 15, same being responsible for managing this information and, consequently, for sorting and managing the steps to be carried out during the process of de-energization and unlocking of the equipment 7.

In its preferred configuration, the communication established between the control devices 2 and the intelligent locks 1 with the central server 15 is established by wireless means such as, for example, Wi-Fi, Bluetooth and other types of communication capable of performing the communication between these elements over large distances when necessary.

Figure 3:
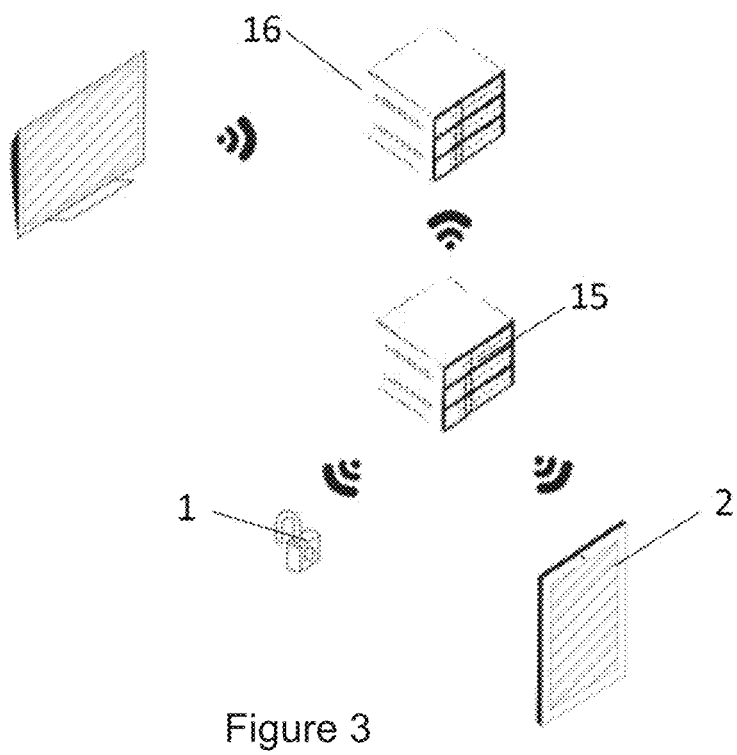
FIG. 3 shows a schematic view of the preferred configuration of the communication of the unlocking and de-energization management system of the present invention.

Further in its preferred configuration, the central server 15 comprises a communication with a platform 16, this platform being provided in the form of a place or a cloud to enable remote access to the data and information relayed between the control devices 2 and the intelligent locks 1 of the system of the present invention, enabling real-time monitoring of all the processes of de-energization and unlocking which are occurring or have been concluded at the industrial plant, see FIG. 3.

In alternative configurations, to further increase the safety of the system of the present invention, the platform 16 may be in charge of authorizing the steps to be carried out during the unlocking and de-energization process by means of the system of the present invention, such that if there is no approval by a person in charge in a control room of the industrial plant with access to the platform 16, the central server 15 does not communicate the next step to the control device 2 or to the intelligent lock 1, preventing the continuation of the unlocking and de-energization process.

Figure 4:
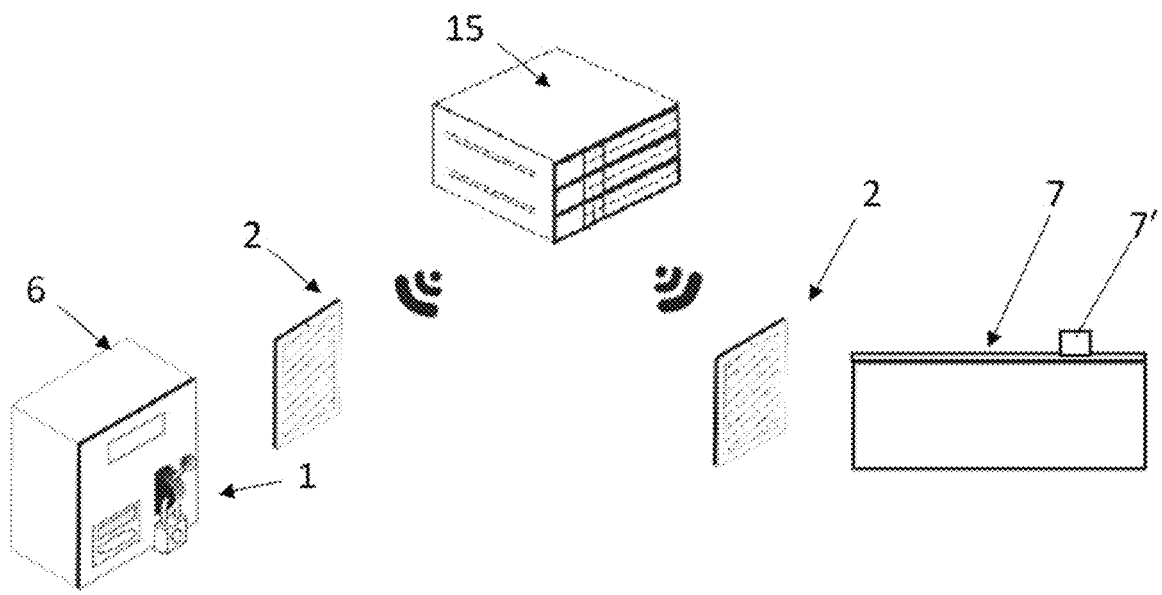
FIG. 4 shows a schematic view of the preferred configuration of the unlocking and de-energization management system of the present invention.

The control device 2 consists of equipment configured to perform all the monitoring and actions of the system, this being, in its preferred configuration, a mobile electronic device 2', which may take on the form of hardware with processor and embedded system, a mobile device or even a tablet. The preferred configuration of the unlocking and de-energization management system comprise two control devices 2, one being provided with a person in charge of maintenance near the equipment 7 and the other provided with a person in charge of de-energization near the power source 6, see FIG. 4.

Figure 5:
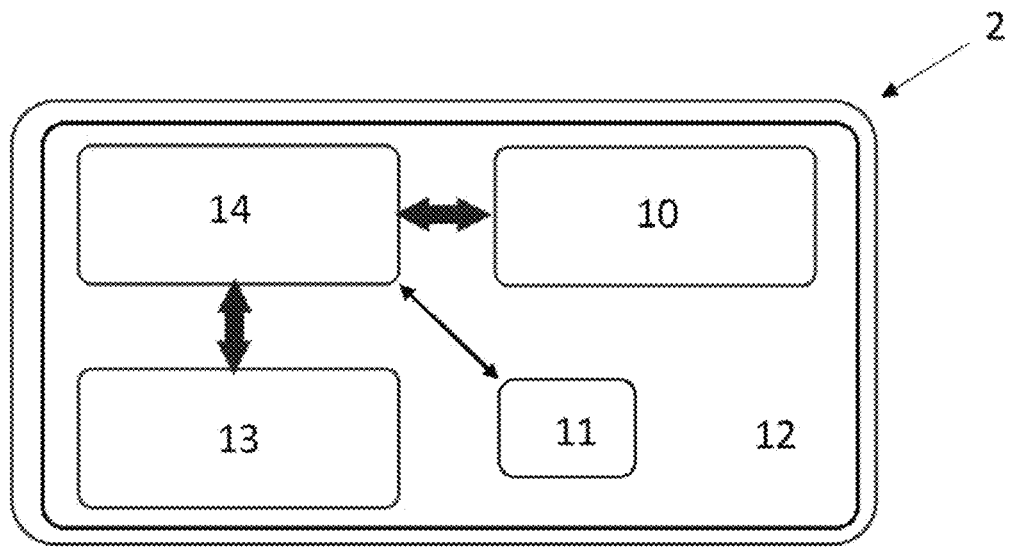
FIG. 5 shows a schematic view of the preferred configuration of the control device of the unlocking and de-energization management system of the present invention.

In its preferred configuration, the control device 2 comprises a communication interface 10, a reader element 11, a visor 12, an identification element 13 and an electronic processor 14, see FIG. 5. The communication interface 10 of the control device 2 is endowed with a receiver and a transmitter configured to emit and receive data from the central server 15 and from the communication interface 3 of the intelligent lock 1.

This communication between the control device 2 and the central server 15 is crucial to enable access and process all the data relating to the unlocking and de-energization processes occurring at the industrial plant by means of the equipment management and de-energization system 7 of the present invention.

In its preferred configuration, the communication between the control device 2 and the central server 15 is carried out via Wi-Fi, and in alternative data configurations can be carried out via Ethernet or other transmission and reception means.

Having the data relating to the equipment management and de-energization system 7 of the present invention in a central server 15 makes it possible for multiple control devices 2 to have access to the data, and multiple intelligent locks 1 also power this processor and have access to these data, making the entire system of the present invention integrated and communicative between its elements.

Additionally, this communication and arrangement of all the data of the equipment management and de-energization system 7 by means of the platform 16 communicating with the central server 15 enables this data to be accessed remotely by other authorized devices such as, for example, in a control room or other type of monitoring at the industrial plant, guaranteeing an inspection and a check of all the unlocking and de-energization processes requested, in progress and ended at the industrial plant.

The communication between the control device 2 and the intelligent lock 1 also has a crucial importance in the present invention, guaranteeing that by means of this communication it is possible to define and identify the location of all the intelligent locks 1 of the system, and also to check the status of each one of them remotely and in real time.

In its preferred configuration, this communication between the control device 2 and the intelligent lock 1 is carried out by means the central server 15 itself via Wi-Fi, and in alternative configurations can be carried out directly between the control device 2 and the intelligent lock 1 via Wi-Fi or other types of wireless communication known in the state of the art such as, for example, Bluetooth, its communication preferably being via Wi-Fi only as a result of the distance that this communication can be established.

By means of this communication between the control device 2 and the intelligent lock 1, it is possible to identify and visualize, in real time, the location and the status of all the intelligent locks 1 of the system, in addition to carrying out new requests for equipment unlocking and de-energization 7 and monitoring the requests in progress, which are described in greater detail in the description of the method.

The reader element 11 of the control device 2, as its name already infers, is configured to read an identifier 7' provided in the equipment 7 intended for maintenance. This identifier 7' is configured to store data digitally on its power sources 6, enabling the identification of the power sources 6 which should be switched off and locked to perform maintenance on the equipment 7 merely by reading the identifier 7'.

In its preferred configuration, the identifier 7' consists of a QR Code and the reader element 11 consists of a camera, enabling, by reading the QR Code of the identifier 7' by the reader element 11, the control device 2 to send this information to the central server 15 and the same to process the information and signalize the power sources 6 which should be switched off and locked, sending this information to the intelligent lock 1 and to the control device 2.

Therefore, on reading of the identifier 7' of the equipment 7 intended for maintenance by means of the reader element 11 of the control device 2, same is capable of signaling the power sources 6 which must be switched off and locked and, by means of the control device 2 itself in communication with the central server 15 of the system of the present invention, begin a request for unlocking and de-energization of the power sources 6 of the equipment 7.

In alternative configurations, the identifier 7' may consist of other means of storing and identifying data such as, for example, a RFID adhesive, a Bluetooth module or other type of identifier capable of storing the information on the power sources 6 of the equipment 7.

The information and the data to be displayed by reading the identifier 7' by means of the reader element 11 should be previously added into the system of the present invention, such as to carry out a mapping of all the power sources 6 and their respective equipment 7 disposed at the industrial plant where the unlocking and de-energization system of the present invention is applied, guaranteeing the fast identification of the power source 6 which should be switched off and locked for maintenance of the equipment 7.

The methods and/or means used to acquire and store this information and data are not described in greater detail, not being the focus of the present invention, such that it is important for the equipment unlocking and de-energization system 7 of the present invention to access the data and information on the power source 6 of the equipment 7 by means of reading an identifier 7' fastened to the equipment 7 performed by the reader element 11 of the control device 2.

In its preferred configuration, the visor 12 comprised by the control device 2 consists of a screen for displaying all the information and the data communicated between the control devices 2 and the intelligent locks 1 of the unlocking and de-energization system of the present invention.

This display of the data and information on the visor 12 of the control device 2 enables the user thereof to be aware of all the unlocking and de-energization processes in progress, finalized and, furthermore, request new unlocking and de-energization processes for other equipment 7, thus guaranteeing safe monitoring of the unlocking and de-energization processes by means of all the communication and checks comprised within the system of the present invention.

The identification element 13 of the control device 2 is configured to identify the collaborators that are making use of the control device 2, as well as the collaborators that are in charge of switching off and unlocking the power source 6 and for performing the maintenance on the equipment 7, guaranteeing trackability of those involved in each unlocking and de-energization process.

In its preferred configuration, the identification element 13 consists of a biometric reader, such that as and when the collaborator is involved in performing any step of the unlocking and de-energization process, same is identified to the control device 2 by means of the biometrics reader.

In alternative configurations, the identification element 13 of the control device 2 can address other types of devices such as, for example, a retina reader, an encoded card or other type of identifier, it merely being crucial that same is capable of identifying and registering the collaborator and his/her role in a given step of the unlocking and de-energization process performed by the system of the present invention.

Figure 6:
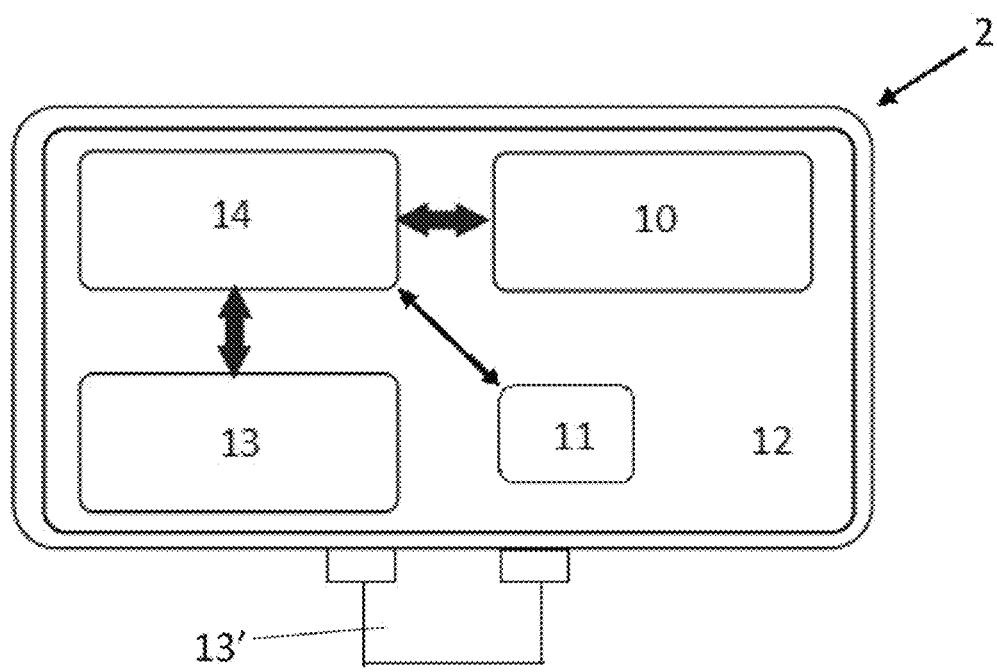
FIG. 6 shows a schematic view of one of the alternative configurations of the control device of the unlocking and de-energization management system of the present invention.

Further in alternative configurations, the identification element 13 of the control device 2 may additionally comprise an encoded card 13' jointly with the biometric reader, such that the registration of the collaborators in the control device 2 is only permitted with the insertion of this encoded card. Therefore, it may be that during maintenance of the equipment 7 this encoded card, after the registration of the collaborators involved in the maintenance, be deposited in the department box and locked by the lock of the collaborators, such that it is not possible to release the encoded card 13' to perform a fresh identification of the collaborators and, accordingly, request re-connection of the power source 6, see FIG. 6.

Further in its alternative configuration, the identification element 13 may comprise a printer 14 connected to same, such that the printer is capable of printing a receipt with the data of the collaborator identified and with the data of the unlocking and de-energization being carried out, guaranteeing greater trackability and enabling the collaborator to place this receipt in his/her personal lock in the department box.

The data on the collaborators identified by the identification element 13 of the control device 2, as well as the identification of the power source 6 of the equipment 7, are also provided on the central server 15 or other server accessible by the equipment unlocking and de-energization management system 7 of the present invention.

In its preferred configuration, data that is crucial for the control device 2 of the system of the present invention to identify, display and analyze consists of the name of the collaborator, an identification number for same such as, for example, his/her registration, position and duties, such that this information is processed by the central server 15 and by the electronic processor 14 of the control device 2 and, subsequently, displayed on the visor 12.

This processing of the data identified by the identification element 13 of the control device 2 consists of a check as to whether the step to be carried out by the collaborator registered in the system is in harmony with his/her position and duties, thus guaranteeing that only suitable professionals perform the steps comprised in the unlocking and de-energization process by the system of the present invention.

For example, following a request for the switching off and the unlocking of a power source 6 of the equipment 7 to undergo maintenance, if during the registration of the collaborators in charge a collaborator is identified as having an incompatible position to the step to be carried out, that is, unlocking and switching off of the power source 6, the control device 2 automatically displays a warning to bar the registration of this collaborator for this request, whereby preventing unsuited or unauthorized professionals from performing the service and jeopardizing safety.

Having described the equipment unlocking and de-energization management system 7 of the present invention, there are evident gains in safety, efficiency and productivity brought by same during the equipment unlocking and de-energization process 7 requiring maintenance, the equipment unlocking and de-energization method 7 that makes use of the system described above being described ahead.

The equipment unlocking and de-energization method 7 of the present invention comprises twelve steps, these being described in detail ahead, enabling a full understanding of the method and, furthermore, assisting with the understanding of the equipment unlocking and de-energization system 7 used to carry out the method.

The first step of the method consists of identifying the power sources 6 which should be switched off to perform maintenance on the equipment 7. This identification is carried out by means of the control device 2, which takes a reading of the identifier 7' of the equipment 7 to identify which power sources 6 power the equipment 7 and thus provide this information in the system of the present invention by means of the central server 15.

The control device 2 to take a reading of the identifier 7' of the equipment 7 is handled by a collaborator in charge of maintenance, such that on taking the reading of the identifier 7' of the equipment 7 by means of the reader element 11 of the control device 2, the information is relayed to the central server 15 and, consequently, a request is made for the unlocking and de-energization of the power sources 6 identified in this first step.

The second step consists of requesting the unlocking and de-energization of the power sources 6 identified by the control device 2 after the reading of the identifier 7' of the equipment 7 by means of the reader element 11 of the control device 2. This step is carried out by means of the control device 2 which, by means of his/her processor 14 and communication module 10, relays this request to the central server 15, providing the information relating to the equipment 7 to undergo maintenance and to its power sources 6 to be switched off and locked in the control device 2.

This information relayed by the central server 15 between the control device 2 and the intelligent lock 1 consists of signaling the power source 6 which should be locked by means of the intelligent lock 1, such that the visor 12 of the control device 2 shows the identification code of the power source 6 which should be locked by means of the intelligent lock 1 available in the system of the present invention.

To prevent the control device 2 from being transported through the industrial plant of the place where the equipment 7 is located to the place where its power source 6 is located and vice versa, in the preferred configuration thereof, there are disposed two control devices 2, one being provided with the collaborators in charge of maintenance of the equipment 7 and the other control device 2 provided with the collaborators in charge of switching off and unlocking the power source 6.

The third step consists of switching off and unlocking of the power source 6 indicated in the preceding step, this step being carried out by the collaborators in charge authorized to carry out same. The request for unlocking and de-energization is provided in the control device 2, such that the person in charge of carrying out the unlocking and de-energization is identified by means of the identifier element 13 and, if he/she has the position and duties necessary to carry out this step, the unlocking begins.

The switching off and unlocking of the power source 6 is carried out by means of switching off and insertion of the intelligent lock 1 into the power source 6 identified in the first step and that needs to be locked, preventing the power source 6 from being undesirably or involuntarily reconnected by unauthorized third parties.

The fourth step consists of checking the positioning of the intelligent lock 1 with the power source 6 where it was fastened, such that the communication interface 3 of the intelligent lock 1 takes a reading of the communication element 8 of the power source 6, enabling same to be identified and, accordingly, to be checked as to whether it is fastened on the power source 6 identified in the first step of the method.

After this check of the fourth step, if the intelligent lock 1 identifies that it is not fastened on the correct power source 6, same does not activate its electromechanical latch 4 and, therefore, does not unlock it, signaling to the central server 15 and subsequently to the control device 2 that it is unlocked and positioned in the wrong place.

Being aware of the incorrect positioning of the intelligent lock 1 prompted by the control device 2, the collaborator in charge removes the intelligent lock 1 from the wrong power source 6 and fastens it onto the correct power source 6 identified in the first step of the method. Additionally, before the intelligent lock 1 is inserted into the correct power source 6, the collaborator is unable to continue to the next step, since same depends on the unlocking of the intelligent lock 1 at the correct power source 6, thus preventing failures and human error as a result of the erroneous positioning of the intelligent lock 1.

The fifth step consists of unlocking the intelligent lock 1, same being carried out only when the intelligent lock 1 is indeed in the correct power source 6, that is, in the power source 6 identified in the first step for the equipment 7 intended for maintenance. This step of unlocking the intelligent lock 1 is carried out by driving its electromechanical latch 4, commanded by the electronic processor 5 of the intelligent lock 1 and communicating with the central server 15 and, consequently, with the control device 2 by means of its communication interface 3.

Once locked, the intelligent lock 1 can only be unlocked by means of a command of the control device 2 and a communication from the central server 15, whereby preventing unauthorized third parties from mistakenly unlocking the intelligent lock 1 and connecting the power source 6 before the maintenance of the equipment 7 has been finalized.

The sixth step consists of emitting a signal informing on the conclusion of the unlocking and switching off of the power source 6, this signal being sent by means of the communication interface 3 of the intelligent lock 1 to the central server 15 and, subsequently, to the control device 2. By means of this signaling, the collaborators in charge of maintenance of the equipment 7, in possession of the control device 2 are notified that the unlocking and switching off of the power source 6 of the respective equipment 7 was duly carried out and, therefore, may begin maintenance of the equipment 7.

The seventh step is carried out before beginning the maintenance on the equipment 7, consisting of identifying the collaborators involved and in charge of maintenance of the equipment 7. This identification is carried out by means of the identifier element 13 of the control device 2, such that all the collaborators involved in the maintenance of the equipment 7 are identified in the control device 2 and, consequently, in the unlocking and de-energization management system to guarantee that only qualified professionals carry out this step and trackability of those in charge involved.

The seventh step, in its alternative configuration, may further comprise the step of using an encoded card 13', such that the registration of the collaborators can only be made with the insertion of this encoded card 13' which, after conclusion of the identification of the collaborators, the encoded card 13' is inserted inside the department box locked by the personal lock of the collaborators.

Therefore, the encoded card 13' locked inside the department box by means of the personal locks of the collaborators involved in the maintenance prevents the person in charge of maintenance from having access to the encoded card 13' and, accordingly, bars him/her from proceeding with the unlocking and de-energization process, that is, that the person in charge requests re-connection of the power source 6 prior to the conclusion of the eighth step.

The eighth step consists of performing the maintenance on the equipment 7, which may vary according to the type of maintenance and with the equipment 7 on which same is being carried out. Therefore, as the maintenance of the equipment 7 is not the focus of the present invention, further details are not provided thereon.

The ninth step of the method begins after the conclusion of the maintenance on the equipment 7 carried out by the collaborators identified in the preceding step, this step being responsible for emitting a signal informing on the conclusion of the maintenance of the equipment 7. To signal the conclusion of the maintenance of the equipment 7, it is necessary for all the collaborators involved in the maintenance to be identified again by means of the identifier element 13 of the control device 2, guaranteeing that no collaborator is still carrying out maintenance and certifying that all the collaborators are aware of the conclusion of the maintenance.

This emission of a signal indicating the conclusion of the maintenance of the equipment 7 is simultaneous with the tenth step of the method, which consists of a request to carry out the connection and unlocking of the power source 6 so that the equipment 7 may resume its working and activity after the maintenance thereof, this signal being emitted by means of the communication interface 10 to the central server 15 and, subsequently, to another control device 2 with the collaborator in charge of unlocking and de-energization of the third step and to the intelligent lock 1 inserted and locked in the power source 6.

This communication between the control device 2 and the intelligent lock 1 by means of the central server 15 is crucial for carrying out the unlocking thereof, such that, only after the request for unlocking of the aforementioned tenth step can same be detached from the power source 6 it is locking, guaranteeing the safety of the method of the present invention.

In this tenth step, if the intelligent lock 1 is associated to a power source 6 that is related to other equipment 7, and this equipment 7 is also under maintenance, the removal of the intelligent lock 1 is carried out only digitally in the unlocking and de-energization management system of the present invention, not physically removing it from the power source 6 and, consequently, not generating the re-connection of the other equipment 7 that is still under maintenance.

This happens because it is possible that a same power source 6 simultaneously powers two different items of equipment 7. For example, a power source 6 may be responsible for powering a belt conveyor and a vibrating screen, such that, if there is an unlocking and de-energization process in both items of equipment simultaneously, it is possible that the maintenance of one equipment 7, in the example, the belt conveyor or vibrating screen, may be concluded before the other.

In this case, with the maintenance of the belt conveyor finalized prior to the maintenance of the vibrating screen, a communication is emitted to unlock the power source 6 of this equipment 7 (belt conveyor). However, as the power source 6 is the same for the vibrating screen, which is still under maintenance, this unlocking is performed only digitally, such that the intelligent lock 1 does not unlock its electromechanical latch 4, since the unlocking relating to the vibrating screen is in use.

The eleventh step consists of switching on and unlocking the power source 6 of the equipment 7, this step being carried out by the collaborator in charge of the unlocking and de-energizing of the third step. The switching on and unlocking of the power source 6 consists of removing the intelligent lock 1 from the power source 6, such that the intelligent lock 1 has its electromechanical latch 4 deactivated in the tenth step as a result of the emission of a signal authorizing its unlocking, enabling it to be manually removed by the collaborator.

After the removal of the intelligent lock 1 of the power source 6 of the equipment 7, the twelfth and final step of the method of the present invention begins, consisting of signaling the conclusion of the connection and unlocking of the power source 6 of the equipment 7, this step being carried out by identifying the collaborator in charge of the eleventh step in the control device 2 by means of the identifier element 13, signaling that maintenance of the equipment 7 has been concluded and same is working again, finalizing the unlocking and de-energization method of the present invention.

Therefore, having described both the equipment unlocking and de-energization system 7 of the present invention, and the unlocking and de-energization method that makes use of said system, it is clear that the present invention meets the objectives proposed, significantly increasing the safety, productivity and efficiency of the equipment unlocking and de-energization processes 7.

This enhanced safety is achieved by means of the communication and arrangement of information and data in a cloud server that carries out a communication in real time of the control devices 2 and of the intelligent locks 1 of the system 1, enabling monitoring and real-time checking of the equipment unlocking and de-energization processes 7 requested, in progress and finalized at the industrial plant where the system is applied.

Additionally, the safety is also enhanced due to the communication existing between the intelligent lock 1 and the power source 6, such that the intelligent lock 1 is capable of identifying whether it is at the correct power source 6 for the equipment 7 intended for maintenance and, by means of this check, bars unlocking from being carried out at a wrong power source 6, guaranteeing safety during the unlocking and de-energization process of the equipment 7.

Nevertheless, the enhanced safety is also due to the identification of the power source 6 of the equipment 7 by means of the control device 2, which takes a reading from an identifier 7' disposed in the equipment 7 by means of its reader element 11, identifying and signaling the power source 6 which should be switched off and locked so as to begin maintenance on the equipment 7.

The increase in efficiency and productivity derives from minimizing the downtime and unlocking of the equipment 7 during maintenance, automating part of the unlocking and de-energization process thereof to accelerate the total time for maintenance and, accordingly, to have the equipment 7 switched off during the shortest possible time.

Additionally, the increase in efficiency and productivity also directly derives from the increase in safety, such that the morale of the collaborators involved in the equipment unlocking and de-energization process 7 is raised, generating greater motivation thereof and increasing their productivity, besides preventing stoppages of the equipment 7 as a result of accidents as may occur during the unlocking and de-energization process of the power source 6 of the equipment 7.

Therefore, it should be understood that the equipment unlocking and de-energization system 7 and the equipment unlocking and de-energization method 7 of the present invention described herein are just some of the embodiments and examples of situations that might occur, the real scope of protection of the object of the present invention being defined in the claims.

What is claimed is:

1. An equipment locking and de-energization management system comprising:
    an intelligent lock (1) configured to be inserted into a power source (6) responsible for providing energy to the equipment (7),
    the intelligent lock (1) comprising: a body (1'), a lock (1"), a communication interface (3) configured to communicate with and identify a communication element (8) of the power source (6), an electromechanical latch (4) capable of locking and unlocking the lock (1") of the intelligent lock (1), an electronic processor (5) configured to process the information received and sent by means of the communication interface (3) and drive the electromechanical latch (4) of the intelligent lock (1), and a sensor (9) to identify whether the intelligent lock (1) is locked or unlocked; and
    two mobile control devices (2), each mobile control device (2) comprising a communication interface (10) configured to communicate with the communication interface (3) of the intelligent lock (1), a visor (12) capable of displaying the information communicated between the intelligent lock (1) and at least one of the two mobile control devices (2), a reader element (11) configured to read an identifier (7') fastened on the equipment (7), an identification element (13), and an electronic processor (14) configured to process the information received and sent from the reader element (11), the identification element (13) and the intelligent lock (1),
    a central server (15) in communication with the communication interface (3) of the intelligent lock (1) and the communication interface (10) of each one of the mobile control devices (2), wherein the central server (15) is configured to intermediate the communication between the two mobile control devices (2), receive and relay data from the mobile control devices (2), and process, store and manage such data, wherein the communication between the communication interface (3) of the intelligent lock (1) and the communication element (8) of the power source (6) identifies which intelligent lock (1) is fixed to which power source (6), wherein the communication interface (3) of the intelligent lock (1) is configured to prevent the electromechanical latch (4) from locking the lock (1") when the identification of the communication element (8) of the power source (6) does not correspond to the identification of the power source (6) of the equipment (7) intended for maintenance, wherein the two mobile control devices (2) comprise: a first mobile control device (2) provided with the collaborators in charge of maintenance of the equipment (7) having the communication interface (10) in communication with the central server (15) and the reader element (11) in communication with the identifier (7'), and a second mobile control device (2) provided with the collaborators in charge of switching off and locking the power source (6) having the communication interface (10) in communication with the central server (15) and with the communication interface (3) of the intelligent lock (1), wherein the identification element (13) of the first mobile control device (2) is configured to identify a person in charge of maintenance and the reader element (11) of the first mobile control device (2) is configured to read the identifier (7') provided in the equipment (7) intended for maintenance, wherein the identification element (13) of the second mobile control device (2) is configured to identify the person in charge of the de-energization and the power source (6) in which the intelligent lock (1) must be inserted.

2. The equipment locking and de-energization management system according to claim 1, wherein the identification element (13) consists of a biometric reader identifying, at least, the name, identification number, post and duties of the collaborators.

3. The equipment locking and de-energization management system according to claim 1, wherein the communication element (8) of the power source (6) is an active communication element.

4. The equipment locking and de-energization management system according to claim 1, wherein the central server (15) is configured to connect multiple mobile control devices (2) and multiple intelligent locks (1) to communicate with each other and access data stored in the system.

5. The equipment locking and de-energization management system according to claim 1, wherein the intelligent lock (1) further comprises a signaling means (9'), the signaling means (9') comprising a display signaling the status of the lock and/or sound signals configured to indicate whether the intelligent lock (1) is locked or unlocked.

6. The equipment locking and de-energization management system according to claim 1, wherein the identification element (13) of the first mobile control device (2) is configured to receive an encoded card (13') to activate and deactivate the identification element (13).

7. The equipment locking and de-energization management system according to claim 6, further comprising a department box, wherein the encoded card (13') is stored in the department box during the maintenance and the department box is locked by locks of the collaborators involved in the maintenance.

8. The equipment locking and de-energization management system according to claim 1, further comprising a platform (16) communicating with the central server (15) to provide access to the data and information of the locking and de-energization management system remotely.

9. The equipment locking and de-energization management system according to claim 8, wherein the platform (16) authorizes steps to be carried out during the unlocking and de-energization of the power source (6) by requiring the approval of such unlocking and de-energization by a person in charge and preventing the communication of such steps if such approval is not provided.

* * * * *